US008357239B2

(12) United States Patent
Boxley et al.

(10) Patent No.: US 8,357,239 B2
(45) Date of Patent: Jan. 22, 2013

(54) TREATMENT OF FLY ASH FOR USE IN CONCRETE

(75) Inventors: Chett Boxley, Park City, UT (US); Akash Akash, Salt Lake City, UT (US); Qiang Zhao, Natick, MA (US)

(73) Assignee: Ceramatec, Inc., Salt Lake City, UT (US)

( * ) Notice: Subject to any disclaimer, the term of this patent is extended or adjusted under 35 U.S.C. 154(b) by 0 days.

(21) Appl. No.: 13/450,272

(22) Filed: Apr. 18, 2012

(65) Prior Publication Data

US 2012/0216715 A1 Aug. 30, 2012

Related U.S. Application Data

(60) Division of application No. 12/275,437, filed on Nov. 21, 2008, now Pat. No. 8,177,906, which is a continuation-in-part of application No. 11/776,892, filed on Jul. 12, 2007, now Pat. No. 8,172,940.

(51) Int. Cl.
*C04B 18/06* (2006.01)

(52) U.S. Cl. ............... 106/705; 106/DIG. 1

(58) Field of Classification Search ............ 106/705, 106/DIG. 1
See application file for complete search history.

(56) References Cited

U.S. PATENT DOCUMENTS

| | | | |
|---|---|---|---|
| 4,210,457 A | 7/1980 | Dodson et al. | |
| 4,640,715 A * | 2/1987 | Heitzmann et al. | 106/706 |
| 4,642,137 A | 2/1987 | Heitzmann et al. | |
| 4,842,649 A | 6/1989 | Heitzmann et al. | |
| 4,997,486 A | 3/1991 | Bolsing | |
| 5,399,246 A | 3/1995 | Joshi | |
| 5,601,643 A | 2/1997 | Silverstrim et al. | |
| 5,820,668 A | 10/1998 | Comrie | |
| 5,968,254 A | 10/1999 | Dodgen et al. | |
| 5,997,632 A | 12/1999 | Styron | |
| 6,204,430 B1 | 3/2001 | Baldwin et al. | |
| 6,482,258 B2 | 11/2002 | Styron et al. | |
| 6,802,898 B1 | 10/2004 | Liskowitz et al. | |
| 6,869,473 B2 | 3/2005 | Comrie | |
| 7,141,112 B2 | 11/2006 | Comrie | |

(Continued)

FOREIGN PATENT DOCUMENTS

| | | |
|---|---|---|
| EP | 0296621 A1 | 12/1988 |
| KR | 1019960028989 | 4/1998 |

(Continued)

OTHER PUBLICATIONS

Gao, Yu-Ming et al., "Effects of Carbon on Air Entrainment in Fly Ash Concrete: The Role of Soot and Carbon Black", *Energy & Fuels*, vol. 11, No. 2 (1997), (1997), 457-462.

(Continued)

*Primary Examiner* — Paul Marcantoni
(74) *Attorney, Agent, or Firm* — David Fonda

(57) ABSTRACT

A process for treating fly ash to render it highly usable as a concrete additive. A quantity of fly ash is obtained that contains carbon and which is considered unusable fly ash for concrete based upon foam index testing. The fly ash is mixed with a quantity of spray dryer ash (SDA) and water to initiate a geopolymerization reaction and form a geopolymerized fly ash. The geopolymerized fly ash is granulated. The geopolymerized fly ash is considered usable fly ash for concrete according to foam index testing. The geopolymerized fly ash may have a foam index less than 40%, and in some cases less than 20%, of the foam index of the untreated fly ash. An optional alkaline activator may be mixed with the fly ash and SDA to facilitate the geopolymerization reaction. The alkaline activator may contain an alkali metal hydroxide, carbonate, silicate, aluminate, or mixtures thereof.

24 Claims, 2 Drawing Sheets

U.S. PATENT DOCUMENTS

| | | | |
|---|---|---|---|
| 7,883,576 B2 * | 2/2011 | Comrie | 106/600 |
| 8,038,789 B2 | 10/2011 | Boxley | |
| 8,172,940 B2 | 5/2012 | Boxley et al. | |
| 8,177,906 B2 | 5/2012 | Boxley | |
| 2002/0017224 A1 | 2/2002 | Horton | |
| 2003/0188668 A1 | 10/2003 | Bland | |
| 2003/0233962 A1 | 12/2003 | Dongell | |
| 2004/0168611 A1 | 9/2004 | Dresin et al. | |
| 2008/0017077 A1 | 1/2008 | Abbate | |
| 2009/0257948 A1 | 10/2009 | Fiore et al. | |

FOREIGN PATENT DOCUMENTS

| | | |
|---|---|---|
| KR | 1020050074538 | 8/2005 |

OTHER PUBLICATIONS

Young, Lee W., "International Search Report", International Application No. PCT/US_08/08461, (Oct. 10, 2008), 1-2.

Young, Lee W., "Written Opinion of the International Searching Authority", International Application No. PCT/US_08/08461, (Oct. 10, 2008), 1-5.

Shin, Sang Hoon "International Search Report", International App. No. PCT/US2009/055909, (Apr. 13, 2010), 1-3.

Shin, Sang Hoon "Written Opinion of the International Searching Authority", International App. No. PCT/US2009/055909, (Apr. 13, 2010), 1-5.

Shin, Sang Hoon "International Search Report", International App. No. PCT/US2009/063911, (Jun. 3, 2010), 1-3.

Shin, Sang Hoon "Written Opinion of the International Searching Authority", International App. No. PCT/US2009/063911, (Jun. 3, 2010), 1-4.

Cha, Keum J., "EPO translation of abstract of KR-1020050074538", (Oct. 19, 2006), 1.

Marcantoni, Paul "Office Action for U.S. Appl. No. 12/275,437", (Sep. 30, 2010), 1-4.

Marcantoni, Paul "Office Action for U.S. Appl. No. 11/776,892", (Sep. 29, 2010), 1-4.

Marcantoni, Paul "Office Action for U.S. Appl. No. 12/553,270", (Apr. 4, 2011), 1-4.

Philar, Ravi "Canadian Office Action", CA 2,692,751, (Oct. 21, 2011), 1-2.

Marcantoni, Paul D., "US Office Action", U.S. Appl. No. 11/776,892, (Nov. 9, 2011), 1-4.

Marcantoni, Paul D., "US Office Action", U.S. Appl. No. 12/275,437, (Oct. 24, 2011), 1-4.

Marcantoni, Paul D., "US Notice of Allowance", U.S. Appl. No. 12/553,270, (Jun. 27, 2011), 1-5.

Im, Nam-Um "Bibliographical Data for KR-10-1996-0028989", Bibliographical Data for KR-10-1996-0028989 (No English Translation of Patent Available), (Apr. 30, 1998), 1-2.

Zhang, et al., "Removal of Ammonium From Aqueous Solutions Using Zeolite Synthesized from Fly Ash by a Fusion Method", *Desalination 271* (2011), *Elsevier*, (Jan. 8, 2011), 111-121.

Verboekend, et al., "Design of Hierarchical Zeolite Catalysts by Desilication", *Catal. Sci. Technol.*, 2011, 1, (Jul. 4, 2011), 879-890.

Egeblad, et al., "Templating Mesoporous Zeolites", *Chem. Mater.*, vol. 20, No. 3 (2008), (Nov. 30, 2007), 946-960.

Snyder, et al., "Hierarchical Nanomanufacturing: From Shaped Zeolite Nanoparticles to High-Performance Separation Membranes", *Agnew. Chem. Int. Ed.* 2007, *46(Wiley-VCH)*, (Aug. 13, 2007), 7560-7573.

Belviso, et al., "Synthesis of Zeolite from Italian Coal Fly Ash: Differences in Crystallization Temperature using Seawater Instead of Distilled Water", *Waste Management, 30*, (2010), *Elsevier*, (Jan. 19, 2010), 839-847.

Kazemian, et al., "Conversion of High Silicon Fly Ash to Na-P1 Zeolite: Alkaline Fusion Followed by Hydrothermal Crystalization", *Advanced Powder Technology, 21*, (2010), *Elsevier*, (Dec. 5, 2009), 279-283.

* cited by examiner

TREATMENT OF FLY ASH FOR USE IN CONCRETE

CROSS-REFERENCE TO RELATED APPLICATION

This application is a divisional of application Ser. No. 12/275,437, filed Nov. 21, 2008 now U.S. Pat. No. 8,177,906, entitled Treatment of Fly Ash for Use in Concrete, which is a continuation-in-part of application Ser. No. 11/776,892, filed Jul. 12, 2007 now U.S. Pat. No. 8,172,940, entitled "Treatment for Fly Ash for Use in Concrete" which applications are incorporated herein by reference.

GOVERNMENT RIGHTS

This invention was made in part with government support under grant number DE-FG02-05ER84197 awarded by the United States Department of Energy. The Government has certain rights in the invention.

BACKGROUND OF THE INVENTION

This invention relates to a process for treating fly ash to render it highly usable as a concrete additive. The invention further relates to treated fly ash, to concrete mixtures containing treated fly ash, and to treated fly ash that entraps unwanted metals or heavy metals.

Fly ash is the finely divided mineral residue resulting from the combustion of pulverized coal in coal-fired power plants. As used herein, fly ash includes similar ashes produced by the combustion of other fuel materials, including but not limited to bark ash and bottom ash. Fly ash may also include a mixture of different ashes. Fly ash consists of inorganic, incombustible matter present in the coal or fuel that has been fused during combustion into a glassy, part amorphous and part crystalline structure.

Fly ash material is solidified while suspended in the exhaust gases and is collected by electrostatic precipitators or filter bags. Since the particles solidify while suspended in the exhaust gases, fly ash particles are generally spherical in shape and range in size from 0.5 µm to 100 µm. They consist mostly of silicon dioxide ($SiO_2$), aluminum oxide ($Al_2O_3$) and iron oxide ($Fe_2O_3$), and are hence a suitable source of aluminum and silicon for geopolymers. They are also pozzolanic in nature and react with calcium hydroxide and alkali to form cementitious compounds.

Fly ash has been classified into two classes, F and C, based on the chemical composition of the fly ash. According to ASTM C 618, the chemical requirements to classify any fly ash are shown in Table 1.

TABLE 1

Chemical Requirements for Fly Ash Classification

| Properties | Fly Ash Class | |
| --- | --- | --- |
|  | Class F | Class C |
| Silicon dioxide, aluminum oxide, iron oxide ($SiO_2 + Al_2O_3 + Fe_2O_3$), min, % | 70.0 | 50.0 |
| Sulfur trioxide ($SO_3$), max, % | 5.0 | 5.0 |
| Moisture Content, max, % | 3.0 | 3.0 |
| Loss on ignition, max, % | 6.0 | 6.0 |

Class F fly ash is produced from burning anthracite and bituminous coals. This fly ash has siliceous or siliceous and aluminous material, which itself possesses little or no cementitious value, but will, in finely divided form and in the presence of moisture, chemically react with calcium hydroxide at ordinary temperature to form cementitious compounds. Class C fly ash is produced normally from lignite and sub-bituminous coals, and some class C fly ashes may contain significant amounts (higher than 10%) of calcium oxide (CaO) or lime. This class of fly ash, in addition to having pozzolanic properties, also has some cementitious properties (ASTM C 618-99).

Color is one of the important physical properties of fly ash in terms of estimating the lime content qualitatively. It is suggested that lighter color indicate the presence of high calcium oxide and darker colors suggest high organic content.

Coal combustion exhaust gases sometimes contain contaminants, such as heavy metals, that must be removed to meet environmental standards. This is often accomplished using activated carbon or other similar sorbents. The activated carbon is usually collected by electrostatic precipitators or filter bags together with the fly ash. Hence, the collected fly ash may be combined with carbon and adsorbed heavy metals. The carbon content may range up to 50% by weight, or more. Because bark ash has a high carbon content, fly ash that contains some bark ash may have a high carbon content.

While most fly ash is disposed in landfills or similar large waste containment facilities, increasing amounts of fly ash are used in the production of concrete. Fly ash may partially replace cement and improve several properties of concrete. However, not all fly ash is suitable for use as a concrete additive. For example, fly ash that contains carbon may absorb air entraining agents (AEAs), which are added to concrete in order to improve its workability and resistance toward freeze-thaw damage. When carbon adsorbs air-entraining agents, they become less available to entrain tiny air bubbles in the concrete which are required to lend the concrete its protection against freeze-thaw conditions. ASTM C 457 defines a standard test method for microscopical determinations of the air content of hardened concrete and of the specific surface, void frequency, spacing factor, and cement paste-air ratio of the air-void system in hardened concrete. ASTM C 457 may be used to determine how well the AEA is working. The degree carbon adsorbs AEAs is dependent on the surface area, type of carbon (very coarse particles or soot), and the polarity of the carbon. Activated carbon, the type commonly used to capture heavy metals and other contaminants in flue gases, effectively captures AEAs.

Air entraining agents can be costly. Fly ash is often added to concrete compositions because it is less expensive than the Portland cement it replaces. However, if the addition of fly ash to concrete compositions requires significantly increased amounts of AEAs, then there may be little or no cost savings gained by adding fly ash to the concrete composition. It would be an improvement in the art to provide a process for treating fly ash so that it substantially reduces the amount of AEA added to the concrete composition compared to untreated fly ash.

Concrete manufacturers and concrete users in the construction industry require concrete to have consistent, predictable properties. Fly ash carbon content can vary widely depending upon the power plant configuration, boiler type, coal type, etc. Differences in fly ash can affect the amount of AEA that must be added to produce the desired concrete properties. It would be an advancement in the art to provide a process for treating fly ash that substantially reduces the affect of varying fly ash carbon content. Such a process is provided herein.

BRIEF SUMMARY OF THE INVENTION

This invention includes a process for treating fly ash to render it highly usable as a concrete additive. The invention also includes treated fly ash, concrete mixtures containing the treated fly ash, and to treated fly ash that entraps unwanted metals or heavy metals. As used herein, the term concrete refers to a material made by mixing a cementing material, such as Portland cement, an aggregate, such as sand and/or gravel, and sufficient water to cause the cement to set and bind the mixture. Under the foregoing definition, mortar, which comprises a cementing material, sand, and water, may be considered a type of concrete.

In one embodiment of the process of treating fly ash for use as a concrete additive within the scope of the invention, a quantity of fly ash is obtained that contains carbon. The fly ash will typically be considered unusable for concrete based upon foam index testing. Foam index testing, described in greater detail below, is a measure of how much air entraining agent (AEA) must be added to a concrete mixture to be effective. A low foam index test measurement means less AEA must be added to the concrete mixture to produce the desired air entraining effect.

The fly ash is mixed with a quantity of spray dryer ash (SDA) and water to initiate a geopolymerization reaction and form a geopolymerized fly ash. As used herein, the terms mix and mixing are intended to include processes that combine, blend, or contact the fly ash, SDA, and water in a manner that initiates or facilitates the geopolymerization reaction. The geopolymerized fly ash may be added directly to concrete mixtures in a wet or dry form. Upon mixing fly ash with a quantity of SDA and water, the homogeneous mixture may be directly added to a concrete mixture. Alternatively, geopolymerized fly ash may be granulated or powderized and added to concrete mixtures at a later time. A geopolymer encapsulation layer remains around the offending carbon in the fly ash. The encapsulation layer prevents the absorption of the AEA. The resulting geopolymerized and pulverized fly ash is considered, at a minimum, usable fly ash for concrete according to foam index testing. The invention includes geopolymerized fly ash prepared according to the foregoing process and to concrete mixtures comprising the geopolymerized fly ash.

Spray dryer ash (SDA) is produced as a byproduct of a dry sorbent injection flue gas desulfurization (FGD) system. Many coal combustion processes utilize pollution control systems to remove sulfur combustion products from the flue gas. Typical FGD systems include wet scrubbers, spray dry scrubbers, sorbent injectors, and a combined sulfur oxide ($SO_x$) and nitrogen oxide ($NO_x$) process. FGD sorbents include, but are not limited to, lime, limestone, sodium-based compounds, and high-calcium coal fly ash. One known FGD system employs a dry sorbent injection process where the FGD sorbent is powdered sodium sesquicarbonate that is blown into an air duct containing the flue gases. Sodium sesquicarbonate (systematic name trisodium hydrogendicarbonate, $Na_3H(CO_3)_2$), is a double salt of sodium bicarbonate and sodium carbonate ($NaHCO_3 \cdot Na_2CO_3$). The dihydrate ($NaHCO_3 \cdot Na_2CO_3 \cdot 2H_2O$) occurs in nature as the mineral trona. Trona is commonly used in the dry sorbent injection process to remove the sulfur combustion products $SO_x$ ($SO_2$ and $SO_3$).

The flue gases react with a powdered FGD sorbent, such as trona, hydrated lime, or sodium carbonate, to neutralize the sulfur oxides ($SO_x$) present in the flue gases to form safe byproducts. The byproducts and any excess trona powder are typically removed from the flue gas stream using an electrostatic precipitator (ESP). The clean air is then discharged into the atmosphere through the exhaust stack. The material recovered in the ESP is known as spray dryer ash (SDA) and includes a mixture of fly ash, reaction products of trona and $SO_x$, and unreacted trona. While the precise composition of SDA will vary from one coal combustion plant to another coal combustion plant, SDA contains predominantly fly ash (about 70%) with remaining components being the reaction products of trona and sulfur oxides and unreacted trona. There will typically be at least 2.5 wt. % unreacted trona in SDA. Some samples of SDA contain at least 10 wt. % unreacted trona. The unreacted trona contains carbonate compounds that can initiate a geopolymerization reaction with fly ash. The SDA, when mixed with fly ash and water, has a pH sufficiently high to initiate the geopolymerization reaction with the fly ash.

The treated fly ash has a foam index substantially lower than the foam index of untreated fly ash. In some embodiments within the scope of the present invention, the geopolymerized fly ash has foam index typically in the range of 5% to 40% of the foam index of the untreated fly ash. In other embodiments, the geopolymerized fly ash has a foam index less than 20% of the foam index of the untreated fly ash. In yet other embodiments, the geopolymerized fly ash has a foam index less than 15% of the foam index of the untreated fly ash. In still other embodiments, the geopolymerized fly ash has a foam index less than 10% of the foam index of the untreated fly ash.

It has been found that the process of treating fly ash may be repeated one or more times to further lower the foam index test results. In other words, geopolymerized fly ash may be treated again with spray dryer ash and water to lower the foam index even more.

Various techniques may be used to granulate the geopolymerized fly ash, including, but not limited to, spray drying, crushing, grinding, or other similar techniques. In spray drying, the geopolymerized fly ash may be heated to a temperature between 20° C. and 450° C. to help dry the geopolymerized fly ash. In some embodiments, the geopolymerized fly ash may be heated to a temperature between 20° C. and 150° C. As expected, heating will accelerate the drying process. The granulated, geopolymerized fly ash will typically have a mean particle size between 0.1 and 1000 microns. In some embodiments, the geopolymerized fly ash will have a mean particle size between 10 and 100 microns. In many applications, it is desirable to have a range of particle sizes.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
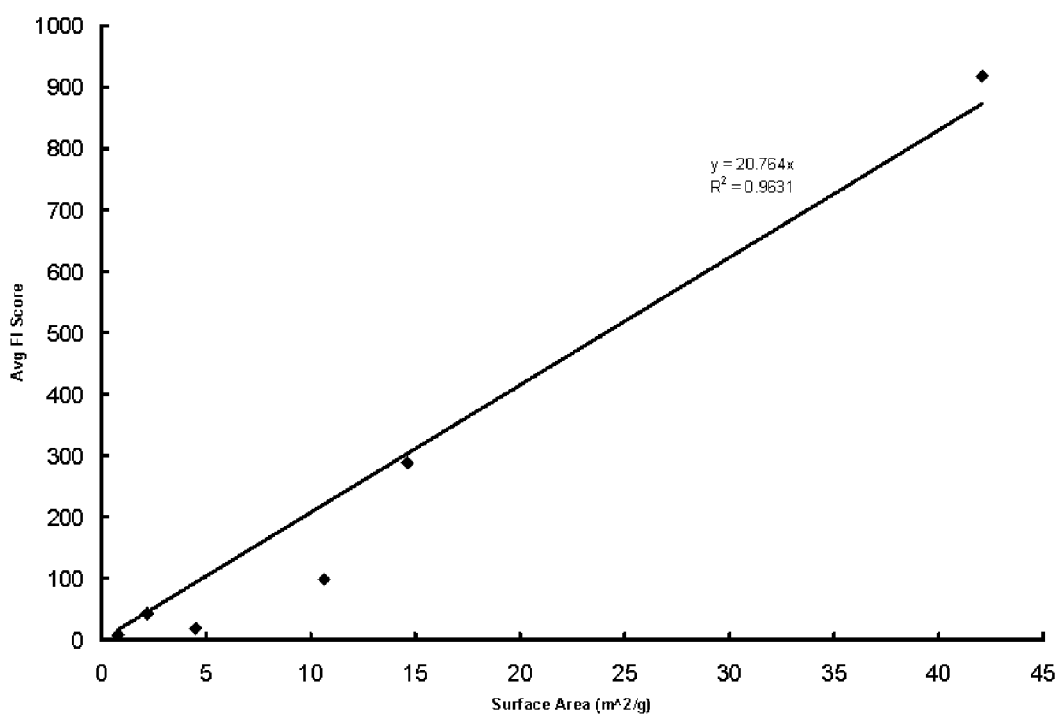
FIG. 1 is a graph comparing foam index results with surface area for untreated fly ash.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of spray dryer ash, fly ash, mixtures thereof, etc., to provide a thorough understanding of embodiments of the invention. One having ordinary skill in the relevant art will recognize, however, that the invention may be practiced without one or more of the specific details or method steps, or with other methods, components, materials, and so forth. In other instances, well-known structures, materials, or operations are not shown or described in detail to avoid obscuring aspects of the invention.

Disclosed herein is a process for treating fly ash to render it highly usable as a concrete additive. The invention is particularly useful for converting fly ash that is considered unusable for concrete into fly ash that is a useful concrete additive. Such unusable fly ash typically contains carbon and often activated carbon of the type used in coal fired power plants for pollution control. The fly ash may also contain one or more unwanted metals or heavy metals, such as, but not limited to, Hg, As, Fe, Mn, Zn, Cr, Co, Pb, Cu, V, and Mg. The metals may typically be present in the ppm (parts per million) concentration, but may be present at high concentration, in the ppt (parts per thousand) level. Foam index testing, described below, provides a measure of whether a particular fly ash may be used effectively as a concrete additive. Low foam index test results are desirable.

The fly ash is treated within the scope of the present invention by mixing the fly ash with a quantity of spray dryer ash and sufficient water to initiate a geopolymerization reaction and form a geopolymerized fly ash. The geopolymerized fly ash may be added directly to concrete mixtures in a wet or dry form. Upon mixing fly ash with a quantity of SDA and water, the homogeneous slurry mixture may be directly added to a concrete mixture. Alternatively, geopolymerized fly ash may be granulated or powderized and added to concrete mixtures at a later time.

The geopolymerized fly ash may be granulated so it may be more easily used in concrete mixtures, including stockpiling or shipping to remote locations for later use. Various techniques may be used to granulate the geopolymerized fly ash, including, but not limited to, spray drying, crushing, grinding, or other similar techniques. The resulting geopolymerized fly ash is usable fly ash for concrete according to foam index testing. Another benefit of the treated fly ash is that unwanted metals or heavy metals are entrapped within the geopolymerized fly ash to inhibit leaching into the environment. The invention includes geopolymerized fly ash prepared according to the foregoing process and to concrete mixtures comprising the geopolymerized fly ash.

The foam index test is a laboratory procedure which determines the adsorption of air-entraining agents in fly ash concrete. In the foam index test, a commercial AEA is added to a fly ash and cement suspension and the suspension is shaken. The added AEA leads to foam formation on top of the liquid surface, which initially behaves in an unstable manner. At the endpoint of the test, the fly ash is "saturated" with the AEA and further addition of the AEA contributes to the foam formation, which eventually becomes stable. The amount of AEA required to obtain stable foam depends on the fly ash quality, where a poor quality fly ash tends to adsorb high amounts of AEA, i.e. more AEA is needed to obtain stable foam.

Foam-index values are based on the amount of air entraining admixture needed in a slurry of 50 mL of water, 4 g of fly ash, and 16 g of cement to produce a layer of foam just covering the surface of liquid in a 473 mL (16 oz) wide mouthed jar after vigorous shaking (Meininger 1981; Gebler and Klieger 1983). There is a good relationship between the minimum amount of admixture in this test necessary to cause foam to cover the surface, without discontinuities, and the admixture dosage needed in concrete containing the same sources of fly ash and cement.

The foam index test procedure used in the following examples is as follows: 4 g of fly ash, 16 g of Portland cement, and 50 mL distilled water are thoroughly mixed in a 4-ounce jar to completely wet the fly ash and cement. This may be accomplished by shaking for about 1 minute. A diluted aqueous solution of AEA is then added dropwise, usually in small increments of about 6 drops (~0.2 mL) at a time. The AEA was Darex® II from W. R. Grace, and it was diluted with distilled water 1:20. It will be appreciated that other AEAs may be used in the foam index test. After each titration, the container is capped and shaken vigorously for 15 seconds, after which time the lid is removed and the liquid surface observed. Prior to the endpoint of the test, the foam on the liquid surface is extremely unstable, the bubbles bursting within a few seconds. If any bubble breaks occur during the 15-second period, then more AEA is added dropwise to the mixture, as described above, until no bubble breaks are observed.

The endpoint is realized when a constant foam is maintained on the surface for at least 45 seconds. A stable foam is achieved when no open areas of liquid show for at least 45 seconds. Bubbles will break rapidly at the AEA levels below the "Index" level. Bubbles will still break for several increments above the "Index" level as well. The number of drops of AEA required to produce this stable foam is referred to as the Foam Index (FI) of the fly ash/cement mixture.

The entire procedure is repeated using 20 g of the cement only thereby yielding a foam index value for the cement. Subtraction of the two values yields an effective foam index for the fly ash. This serves as a measure of the degree to which any given fly ash adsorbs AEAs. (Yu-Ming Gao, Hong-Shig Shim, Robert Hurt, and Eric Suuberg and Nancy Yang, Effects of Carbon on Air Entrainment in Fly Ash Concrete: The Role of Soot and Carbon Black, Energy & Fuels. Vol. 11, No. 2, pp. 457-462, 1996.)

As used herein, a fly ash or treated fly ash that requires fewer than 10 drops of diluted AEA, Darex II, according to the foam index procedure summarized above, is defined to be a premium grade fly ash. A fly ash that requires between 10 drops and 50 drops is defined to be a standard grade fly ash. A fly ash that requires between 50 and 100 drops is defined to be a low-grade fly ash, but one that is still usable. A fly ash that is considered premium grade, standard grade, and low grade, is usable in concrete applications. A fly ash that requires above 100 drops would be considered unusable fly ash for concrete.

The following examples are given to illustrate various embodiments within the scope of the present invention. These are given by way of example only, and it is understood that the following examples are not comprehensive or exhaustive of the many types of embodiments of the present invention that can be prepared in accordance with the present invention.

Examples 1-9

Geopolymerized fly ash was prepared by mixing a quantity of fly ash, spray dryer ash, and water. In some examples a quantity of NaOH was added to the mixture, and then the required amount of water was added. Between 40 and 50 grams of water per 100 grams of SDA+FA (i.e. the total solids) was added.

A small amount of ADVA (plasticizer) may optionally be added to the mixture to prevent clumping. If desired, a plasticizer may be added when the geopolymerized and treated fly ash is added to concrete. A Class C fly ash was used in the Examples 1-9. It was obtained from a U.S. power plant that was using an unknown activated carbon to control Hg. The spray dryer ash was obtained from Xcel Energy (Denver, Colo.). The SDA had a LOI between 3 and 8%. Upon addition of water and mixing, the geopolymerization reaction began occurring. The slurry was quickly put on an electric paint shaker and shaken vigorously for five minutes. In general, a thick texture was observed for the mixture. The mixture or slip usually was still pourable into molds at this point. The solution was still "workable." The mixture remains fluid as mixing continues, but gets progressively more viscous without shaking or mixing. The compositions for Examples 1-9 are set forth below in Table 2.

TABLE 2

Fly ash (FA) treated with Spray dryer ash (SDA)

| Example | SDA (g) | Fly Ash (g) | NaOH (g) | $pH_i$ | $pH_f$ | Avg. FI |
|---|---|---|---|---|---|---|
| 1 | 50.0 | 50.0 | 1.0 | ≈10 | ≈14 | 70.0 |
| 2 | 50.0 | 50.0 | 0.0 | ≈10 | 8.95 | 68.3 |
| 3 | 50.0 | 50.0 | 0.0 |  | ≈9.5 | 61.7 |
| 4 | 37.5 | 12.5 | 0.0 | 11.46 | 12.61 | 53.3 |
| 5 | 12.5 | 37.5 | 0.0 | 12.49 | 11.72 | 86.7 |
| 6 | 37.5 | 12.5 | 0.5 | 12.36 | 12.95 | 45.0 |
| 7 | 12.5 | 37.5 | 0.5 | 12.65 | 12.22 | 61.7 |
| 8 | 25.0 | 25.0 | 2.5 | ≈11 | ≈14 | 60.0 |
| 9 | 25.0 | 25.0 | 5.0 | ≈11 | ≈14 | 33.3 |

Table 2 shows the amount in grams added for each of the components. The concentration of NaOH added to various ratios of SDA and FA was varied. $pH_i$ is the initial pH before adding any NaOH to the mixture. $pH_f$ is the pH measured after the NaOH is added to the mix. Avg FI is the measured foam index (3 trials at each experiment) average after treatment. The untreated fly ash had a foam index score of about 180, and the SDA had a foam index score of about 100. The more SDA added to the mix, the lower the foam index score (compare Examples 2, 3, and 4). Examples 8 and 9 increase the NaOH concentration significantly. The foam index score decreases with increasing NaOH added.

The ratio of spray dryer ash to fly ash may range from between 1:99 and 99:1. In some processes, the ratio of spray dryer ash to fly ash may range from between 1:5 and 5:1, and more preferably between 1:3 and 3:1. Because the amount of SDA generated by power plants is considerably less than the amount of fly ash generated, virgin trona, carbonate, or other alkaline activator material can be mixed with the fly ash and SDA to make the process practical.

Foam index tests were performed on the geopolymerized fly ash. Foam index results may vary depending on the type of fly ash used, the amount of spray dryer ash, the addition of optional alkali hydroxides, amount of water, perhaps time, and maybe even curing temperature. The untreated fly ash required about 180 drops or more to pass the foam index. The foam index test was performed three times for each of the geopolymerized fly ash samples prepared according to Examples 1-9. Based upon the average foam index test results reported in Table 2, each of the resulting geopolymerized fly ash materials showed a substantial decrease in the foam index.

The foam index test results reported in Table 2 indicate that the foam index for geopolymerized fly ash within the scope of the present invention is significantly lower than the foam index for the untreated fly ash. Indeed, the foam index for the geopolymerized fly ash used in Examples 1-9 ranged from about 18.5% to 39% of the untreated fly ash. In some embodiments, the geopolymerized fly ash may have a foam index ranging from about 10% to 40% of the foam index for the untreated fly ash. In some embodiments, the geopolymerized fly ash may have a foam index less than 20% of the untreated fly ash.

The resulting geopolymerized fly ash can have a large range of viscosity during mixing (i.e. untreated fly ash+spray dryer ash+water). The viscosity gradually increases as a function of time; however, different amounts of spray dryer ash and/or the pH of the mixture may affect the rates of reaction. It was observed that using more water makes the mixture more pourable, but it tends to retard setting time. The mixture will not set up while it is being mixed or agitated. Thus, continued mixing will delay setting and permit continued working of the mixture. However, once mixing stops, the geopolymerized fly ash will set. In some cases it may be desirable to add chemical agents to delay or retard setting. Examples of retardants include, without limitation, borax and borate compounds. Retardants may be desirable or even necessary when the geopolymerized fly ash is spray dried.

The geopolymer mix may be allowed to fully set and cure. It may then be crushed back into a powder using a mortar and pestle, a hammer mill or other crushing device. The crushed powder is then sieved through a #80 mesh. Crushing and sieving are optional steps in the process. Then the sample is foam index tested.

It is within the scope of certain aspects of the invention to mix the untreated fly ash, spray dryer ash, and water and then prior to fully curing, to spray dry the mixture and form a powder. Heat may optionally be added to the samples to remove the excess water. The components may also be mixed, and while the sample is still wet, use a mortar and pestle or other crushing device, allow the sample to air dry, and then make a powder from that. On a molecular level, the geopolymerization process during curing is similar to polymer chains cross linking to form larger and larger polymers. This is forming the aluminosilicate network during the curing process.

In Examples 1-9, the fly ash was granulated using a mortar and pestle. Without being bound by theory, it is presently believed that the surface area of the sample is related to its foam index score before treatment. FIG. 1 shows preliminary data suggesting that surface area may affect foam index.

Figure 2:
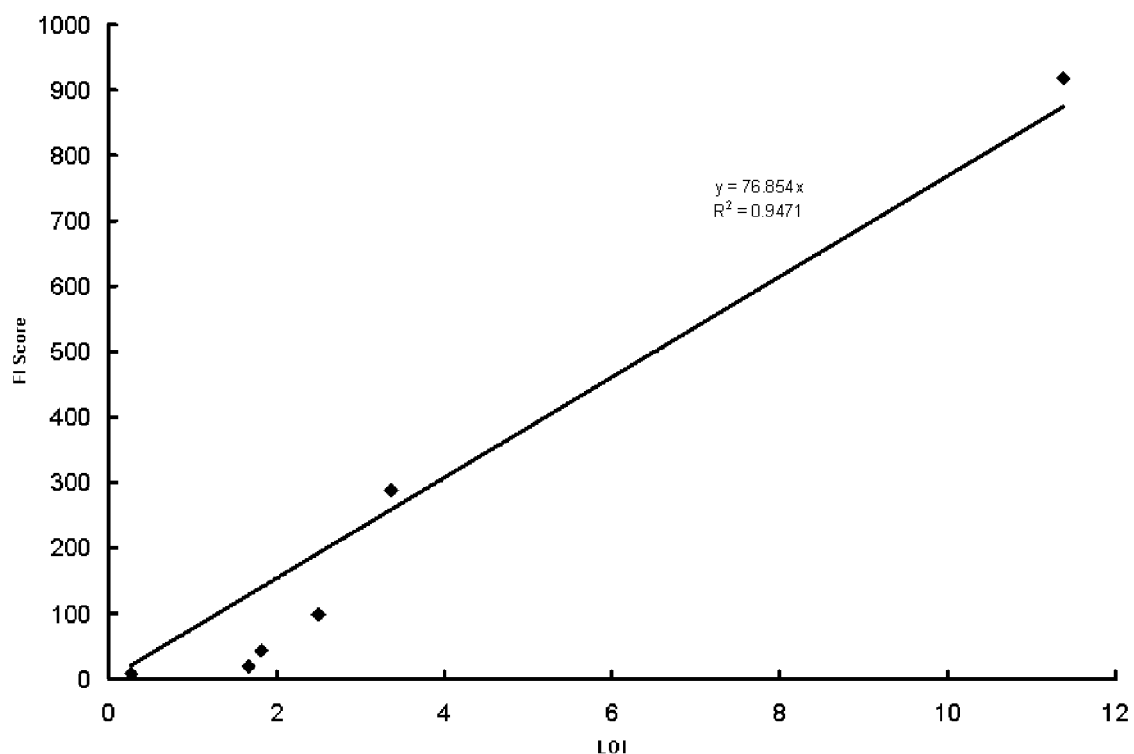
FIG. 2 is a graph comparing foam index results with loss on ignition (LOI) for untreated fly ash.

Traditionally those who use fly ash in concrete mixtures look at foam index as a function of measured LOI (loss on ignition). However, LOI usually refers to the unburned natural carbon that is in the fly ash sample. However, if the source of carbon is activated carbon for Hg control, then such carbon has a high surface area carbon that only marginally increases the LOI, but has an exponential effect on the foam index. In other words 1% LOI of natural carbon may only adsorb 20 drops of AEA, but 1% LOI of activated carbon may adsorb 1000 drops of AEA. FIG. 2 contains an example of the traditional comparison of foam index and LOI.

The results of Examples 1-9 suggest that the different amounts of spray dryer ash and/or optional alkaline activator, such as sodium hydroxide, have different effects on the geopolymerized fly ash. In the SDA there is unreacted trona or carbonate, which is the chemical activator that actually promotes the geopolymerization or encapsulation process of the carbon material in the fly ash. So the more SDA you add to the mixture the more unreacted trona is available to participate in the geopolymerization reaction. Adding hydroxide increases the pH of the solution, and sufficiently high pH is required to facilitate the geopolymerization reaction. Without being bound by theory, it is believed a sufficiently high pH (more hydroxide present) results in a more complete the geopolymerization reaction.

The alkaline activator needs to have a high pH. NaOH is a presently preferred activator and may be used as an activator alone. Other potential alkaline activators may include, but are not limited to a metal carbonate, a metal silicate, a metal aluminate, a metal sulfate, a metal hydroxide, and mixtures thereof. Alkali metals are presently preferred because of their availability and cost, but the invention is not limited to alkali metals. The ingredients of the alkaline activator need not be specially manufactured or pure ingredients. The alkaline activator may include recycled byproducts of industrial processes. An optimum alkaline activator is one that costs next to nothing and requires the least amount of activator to lower the foam index to an acceptable lever. Performance and material costs may be balanced selecting the optional alkaline activator.

The process of treating fly ash may be repeated one or more times to further lower the foam index test results. Geopolymerized fly ash may be granulated and mixed with additional spray dryer ash and water to a second geopolymerization reaction. Additional treatments with spray dryer ash may be made as needed.

While specific embodiments of the present invention have been illustrated and described, numerous modifications come to mind without significantly departing from the spirit of the invention, and the scope of protection is only limited by the scope of the accompanying claims.

The invention claimed is:

1. A geopolymerized fly ash generated by a method comprising the steps of:
   obtaining a quantity of fly ash that contains between 0.1 and 50% carbon, by weight, based upon foam index testing; and
   mixing the fly ash with a sufficient quantity of spray dryer ash and water to initiate a geopolymerization reaction and form a geopolymerized fly ash, wherein the spray dryer ash contains an unreacted flue gas desulfurization sorbent, wherein the geopolymerized fly ash is considered usable fly ash for concrete according to foam index testing.

2. The geopolymerized fly ash according to claim 1, wherein the flue gas desulfurization sorbent is selected from the group consisting of sodium sesquicarbonate, hydrated lime, and sodium carbonate.

3. The geopolymerized fly ash according to claim 1, further comprising the step of mixing an alkaline activator with the fly ash and spray dryer ash.

4. The geopolymerized fly ash according to claim 3, wherein the alkaline activator is selected from the group consisting of a metal carbonate, a metal silicate, a metal aluminate, a metal sulfate, a metal hydroxide, and mixtures thereof.

5. The geopolymerized fly ash according to claim 3, wherein the alkaline activator comprises a metal hydroxide.

6. The geopolymerized fly ash according to claim 1, wherein the ratio of spray dryer ash to fly ash is between 1:5 and 5:1.

7. The geopolymerized fly ash according to claim 1, wherein the ratio of spray dryer ash to fly ash is between 1:3 and 3:1.

8. The geopolymerized fly ash according to claim 1, further comprising the step of granulating the geopolymerized fly ash.

9. The geopolymerized fly ash according to claim 8, wherein the geopolymerized fly ash is granulated by spray drying.

10. The geopolymerized fly ash according to claim 9, wherein the geopolymerized fly ash is heated to a temperature between 20 and 250° C.

11. The geopolymerized fly ash according to claim 9 wherein the geopolymerized fly ash is heated to a temperature between 20 and 150° C.

12. The geopolymerized fly ash according to claim 8, wherein the geopolymerized fly ash is granulated by crushing.

13. The geopolymerized fly ash according to claim 8, wherein the granulated, geopolymerized fly ash has a mean particle size between 0.1 and 1000 microns.

14. The geopolymerized fly ash according to claim 8, wherein the granulated, geopolymerized fly ash has a mean particle size between 10 and 100 microns.

15. The geopolymerized fly ash according to claim 1, further comprising the step of adding the geopolymerized fly ash in wet form directly to a concrete mixture.

16. The geopolymerized fly ash according to claim 1, wherein the geopolymerized fly ash has a foam index less than 40% of the foam index of the untreated fly ash.

17. The geopolymerized fly ash according to claim 1, wherein the geopolymerized fly ash has a foam index less than 20% of the foam index of the untreated fly ash.

18. The geopolymerized fly ash according to claim 1, further comprising the step of mixing the granulated and geopolymerized fly ash with a second quantity of spray dryer ash and water sufficient to initiate a second geopolymerization reaction and form a second geopolymerized fly ash.

19. The geopolymerized fly ash according to claim 1, wherein the alkaline activator comprises a metal carbonate, alone or in combination with a metal hydroxide.

20. The geopolymerized fly ash according to claim 1, wherein the alkaline activator comprises a metal hydroxide, alone or in combination with a metal carbonate.

21. A geopolymerized fly ash generated by a method comprising the steps of:
obtaining a quantity of fly ash that contains unwanted metals or heavy metals; and
mixing the fly ash with a sufficient quantity of spray dryer ash and water to initiate a geopolymerization reaction and form a geopolymerized fly ash, wherein the spray dryer ash contains an unreacted flue gas desulfurization sorbent selected from sodium sesquicarbonate, hydrated lime, and sodium carbonate, wherein the unwanted metals or heavy metals are entrapped within the geopolymerized fly ash to inhibit leaching into the environment.

22. The geopolymerized fly ash according to claim 21, further comprising the step of mixing an alkaline activator with the fly ash and spray dryer ash.

23. The geopolymerized fly ash according to claim 22, wherein the alkaline activator comprises a metal carbonate, alone or in combination with a metal hydroxide.

24. The geopolymerized fly ash according to claim 22, wherein the alkaline activator comprises a metal hydroxide, alone or in combination with a metal carbonate.

* * * * *